E. NOONAN.
Trucks for Brick Yards.

No. 163,393. Patented May 18, 1875.

WITNESSES:

INVENTOR:
Edward Noonan
BY
ATTORNEYS.

UNITED STATES PATENT OFFICE.

EDWARD NOONAN, OF LA SALLE, ILLINOIS.

IMPROVEMENT IN TRUCKS FOR BRICK-YARDS.

Specification forming part of Letters Patent No. 163,393, dated May 18, 1875; application filed April 10, 1875.

*To all whom it may concern:*

Be it known that I, EDWARD NOONAN, of La Salle, in the county of La Salle and State of Illinois, have invented a new and useful Improvement in Horse Off-Bearing Truck for Brick-Yards, of which the following is a specification.

Figure 1:
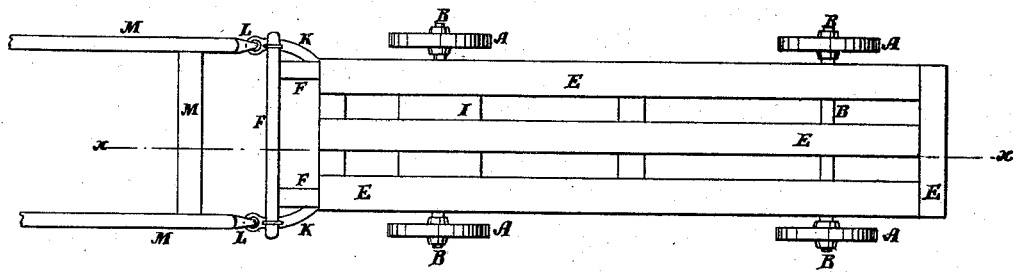
Figure 2:
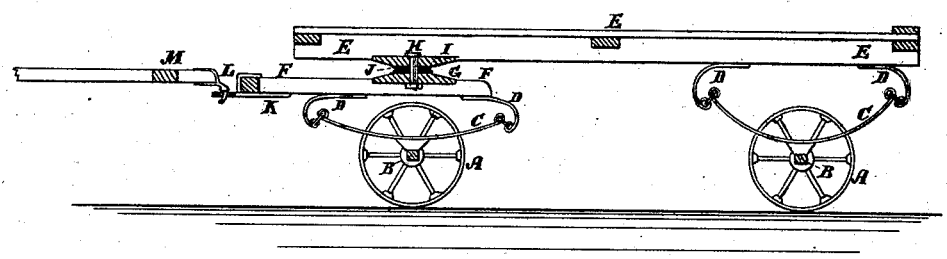
Figure 3:
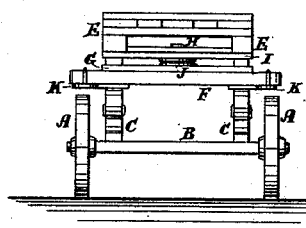

Figure 1 is a top view of my improved off-bearing truck. Fig. 2 is a vertical longitudinal section of the same, taken through the line $x\,x$, Fig. 1. Fig. 3 is a front view of the same, the shafts being detached.

Similar letters of reference indicate corresponding parts.

The object of this invention is to furnish an improved truck for bearing off bricks in a brick-yard, which shall be simple in construction and convenient in use, and shall be so constructed that the shafts may be readily detached from one truck and attached to another without unhitching the horse from the said shafts.

The invention consists in the truck formed of the wheels, the axles, the springs, the body, the platform, and the cross-bars, king-bolt, and washers, constructed and combined with each other as hereinafter fully described; and in the combination of the draft-bars and the flanged hooks with the platform and the shafts, as hereinafter fully described.

A are the wheels, which are about eighteen inches in diameter, and with a tread about two and a half inches wide. The hubs and rims of the wheels are cast-iron, and the spokes are wrought-iron. The wheels A revolve upon the journals of the axles B. To each of the axles B, near the wheels A, are bolted two half-elliptic springs, C, about twenty-seven inches long, and the ends of which are shackled to the ends of curved spring-arms D, or of a longer half-elliptic spring. The spring-arms D, at the rear end of the truck, are bolted to the side bars of the truck-body E, and the spring-arms at the forward end of truck are bolted to the side bars of the platform F. To the rear part of the platform F, directly over the forward axle, is attached a cross-bar, G, which is made half-round upon its upper side, and is connected by the king-bolt H with a cross-bar, I, half-round upon its lower side, and which is secured to the body E. Washers J are placed upon the king-bolt H between the half-round cross-bars G I. The truck-body E is so formed that the brick-molds may be readily placed upon and removed from it. To the side bars and front cross-bar of the platform F are attached iron bars K, the forward ends of which project in front of said cross-bar and have holes formed in them to receive the hooks L, attached to the shafts M. The hooks L are made with flanges or shoulders to rest upon the bars K and prevent the said hooks from entering the holes in the bars L too far. The forward end of the platform F projects in front of the forward end of the body E, so that the driver may sit upon the forward end of the said body and rest his feet upon the forward end of the platform, and may be thus in position to instantly detach the shafts and attach them to another truck. In this way one truck can be drawn away while another is being loaded.

Having thus described my invention, I claim as new and desire to secure by Letters Patent—

1. The combination of the wheels A, the axles B, the springs C D, the body E, the platform F, and the cross-bars, king-bolt, and washers G I H J, substantially as set forth.

2. The combination of the bars K and the flanged hooks L with the platform F, and the shafts M, substantially as set forth.

EDWARD NOONAN.

Witnesses:
JAS. W. DUNCAN,
JNO. O'HALLORAN.